United States Patent
Keen et al.

(10) Patent No.: US 11,030,337 B2
(45) Date of Patent: Jun. 8, 2021

(54) CONFIDENTIAL AUDIO CONTENT LOSS MITIGATION

(71) Applicant: International Business Machines Corporation, Armonk, NY (US)

(72) Inventors: Martin G. Keen, Cary, NC (US); Sarbajit Rakshit, Kolkata (IN); John M. Ganci, Jr., Raleigh, NC (US); James E. Bostick, Cedar Park, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 142 days.

(21) Appl. No.: 16/112,450

(22) Filed: Aug. 24, 2018

(65) Prior Publication Data
US 2020/0065514 A1    Feb. 27, 2020

(51) Int. Cl.
*G06F 21/62* (2013.01)
*G06F 21/16* (2013.01)
(Continued)

(52) U.S. Cl.
CPC .......... *G06F 21/6245* (2013.01); *G06F 21/16* (2013.01); *G06F 21/305* (2013.01);
(Continued)

(58) Field of Classification Search
CPC ... H04L 65/403; H04L 67/02; H04L 63/0428; H04L 65/1069; H04L 65/1006;
(Continued)

(56) References Cited

U.S. PATENT DOCUMENTS 8,244,531 B2 * 8/2012 Erhart .................... G11B 27/28
704/249
2008/0220715 A1 9/2008 Sinha et al.
(Continued)

FOREIGN PATENT DOCUMENTS

| CA | 2584544 | 9/2013 | |
|---|---|---|---|
| IN | 201641004913 | 8/2017 | |
| WO | WO-2019073232 A1 * | 4/2019 | ......... H04L 63/1466 |

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.
(Continued)

*Primary Examiner* — Daniel B Potratz
*Assistant Examiner* — Wansik You
(74) *Attorney, Agent, or Firm* — Brian Restauro; George S. Blasiak; Heslin Rothenberg Farley & Mesiti PC

(57) ABSTRACT

Methods, computer program products, and systems are presented. The method computer program products, and systems can include, for instance: embedding a signature sound on audio content of a first conference in which a first client computer device is connected, wherein the audio content includes confidential content, the signature sound being a sound that is machine detectable and human inaudible; emitting through an audio output device of the first client computer device the audio content of the first conference having embedded thereon the signature sound; receiving by an audio input device of a second client computer device the audio content of the first conference having embedded thereon the signature sound; and in response to the receiving activating a process to mitigate loss of the confidential content.

20 Claims, 8 Drawing Sheets

(51) Int. Cl.
*G10L 19/018* (2013.01)
*G10L 15/02* (2006.01)
*H04B 11/00* (2006.01)
*G06F 21/30* (2013.01)
*G10L 15/08* (2006.01)
*H04W 4/16* (2009.01)

(52) U.S. Cl.
CPC .............. *G10L 15/02* (2013.01); *G10L 15/08* (2013.01); *G10L 19/018* (2013.01); *H04B 11/00* (2013.01); *H04W 4/16* (2013.01)

(58) Field of Classification Search
CPC ............... H04L 65/105; H04L 65/1073; H04L 65/4015; H04L 65/605; G06Q 50/01; G06F 21/16; G06F 21/305; G06F 21/6245; G10L 15/02; G10L 15/08; G10L 15/26; G10L 19/018; H04B 11/00; H04W 12/033; H04W 12/65; H04W 4/16
See application file for complete search history.

(56) References Cited

U.S. PATENT DOCUMENTS

| | | |
|---|---|---|
| 2009/0197584 A1 | 8/2009 | Snow et al. |
| 2013/0097664 A1* | 4/2013 | Herz .................... G06Q 10/10 726/1 |
| 2013/0303149 A1 | 11/2013 | Bocking et al. |
| 2015/0287416 A1* | 10/2015 | Brands ................. H04L 9/0866 704/273 |
| 2016/0379508 A1 | 12/2016 | DeWeese et al. |
| 2017/0188183 A1 | 6/2017 | Lihosit et al. |
| 2018/0343224 A1* | 11/2018 | Lord ..................... H04L 51/10 |

OTHER PUBLICATIONS

Joshi et a., "Automatic Disabling of Cell Phone at Prohibited Areas", http://www.ijetcse.com/wp-content/plugins/ijetcse/file/upload/docx/803Automatic-Disabling-Of-Cellphones-At-Prohibited-Areas-pdf.pdf. IJETCSE: vol. 4 Issue 1, Dec. 2013, 3 pages.

* cited by examiner

CONFIDENTIAL AUDIO CONTENT LOSS MITIGATION

BACKGROUND

Online conferencing systems are widely used to provide collaborative sessions between two or more participants, by allowing the participants to exchange video- and/or audio-content, voice and instant messages, etc. An online conferencing system can be integrated with a variety of collaboration applications, including, for example, media sharing applications, instant messaging applications, video- and audio-streaming applications, and telephony applications.

Data structures have been employed for improving operation of computer systems. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience.

SUMMARY

Shortcomings of the prior art are overcome, and additional advantages are provided, through the provision, in one aspect, of a method. The method can include, for example: embedding a signature sound on audio content of a first conference in which a first client computer device is connected, wherein the audio content includes confidential content, the signature sound being a sound that is machine detectable and human inaudible; emitting through an audio output device of the first client computer device the audio content of the first conference having embedded thereon the signature sound; receiving by an audio input device of a second client computer device the audio content of the first conference having embedded thereon the signature sound; and in response to the receiving activating a process to mitigate loss of the confidential content.

In another aspect, a computer program product can be provided. The computer program product can include a computer readable storage medium readable by one or more processing circuit and storing instructions for execution by one or more processor for performing a method. The method can include, for example: embedding a signature sound on audio content of a first conference in which a first client computer device is connected, wherein the audio content includes confidential content, the signature sound being a sound that is machine detectable and human inaudible; emitting through an audio output device of the first client computer device the audio content of the first conference having embedded thereon the signature sound; receiving by an audio input device of a second client computer device the audio content of the first conference having embedded thereon the signature sound; and in response to the receiving activating a process to mitigate loss of the confidential content.

In a further aspect, a system can be provided. The system can include, for example a memory. In addition, the system can include one or more processor in communication with the memory. Further, the system can include program instructions executable by the one or more processor via the memory to perform a method. The method can include, for example: embedding a signature sound on audio content of a first conference in which a first client computer device is connected, wherein the audio content includes confidential content, the signature sound being a sound that is machine detectable and human inaudible; emitting through an audio output device of the first client computer device the audio content of the first conference having embedded thereon the signature sound; receiving by an audio input device of a second client computer device the audio content of the first conference having embedded thereon the signature sound; and in response to the receiving activating a process to mitigate loss of the confidential content.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
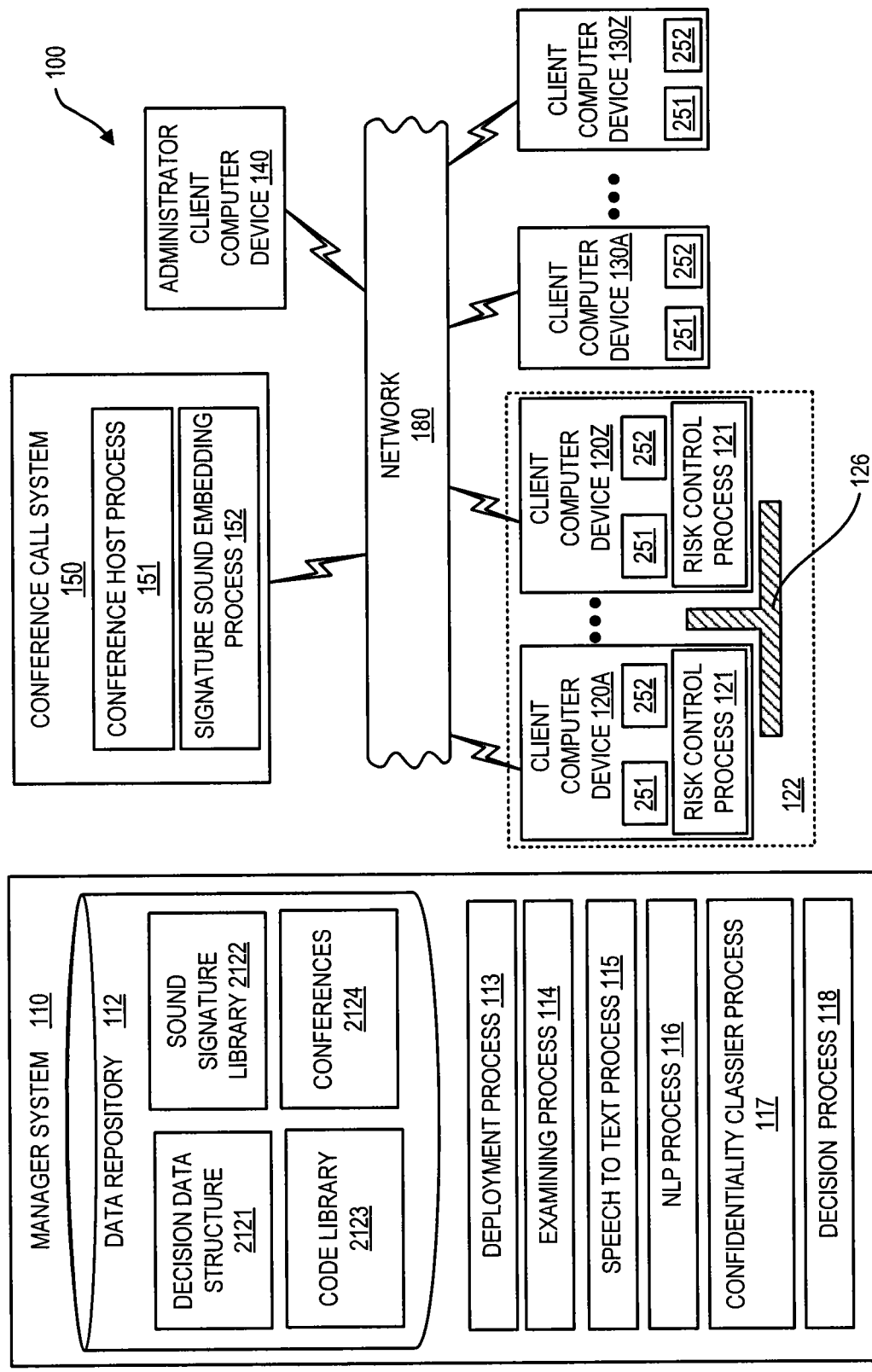
FIG. 1 is a block diagram illustrating a system having a manager system, client computer devices, and a conference call system according to one embodiment.

System 100 for use in mitigating, e.g. eliminating or reducing unintended transfer of confidential content in an online conference environment is set forth herein in reference to FIG. 1. System 100 can include manager system 110, client computer devices 120A-120Z, client computer devices 130A-130Z, and conference call system 150. Manager system 110, client computer devices 120A-120Z, client computer devices 130A-130Z, and conference call system 150 can be in communication with one another via network 180. Manager system 110 Manager system 110, client computer devices 120A-120Z, client computer devices 130A-130Z, and conference call system 150 can be provided by computing node based systems and devices. Network 180 may be a physical network and/or a virtual network. A physical network can be, for example, a physical telecommunications network connecting numerous computing nodes or systems, such as computer servers and computer clients. A virtual network can, for example, combine numerous physical networks or parts thereof into a logical virtual network. In another example, numerous virtual networks can be defined over a single physical network.

According to one embodiment, manager system 110, client computer devices 120A-120Z, client computer devices 130A-130Z, and conference call system 150 can be external to one another. According to one embodiment, one or more of manager system 110, client computer devices 120A-120Z, client computer devices 130A-130Z, and conference call system 150 can be collocated with one another.

Client computer devices 120A-120Z and client computer devices 130A-130Z can be provided, e.g. by smartphones or other types of mobile computing devices, e.g. laptops, PCs, and/or computing node based telephones. Client computer devices of client computer devices 120A-120Z can operate in accordance with speakerphone operation. A client computer device herein can operate in accordance with speakerphone operation by activating a speakerphone mode among other operating modes, or can operate in accordance with speakerphone operation by having a single speakerphone operating mode, e.g. in the case that a client computer device is provided by a speakerphone computing node based telephone, e.g. as may be referred to as a conference phone.

Figure 2:
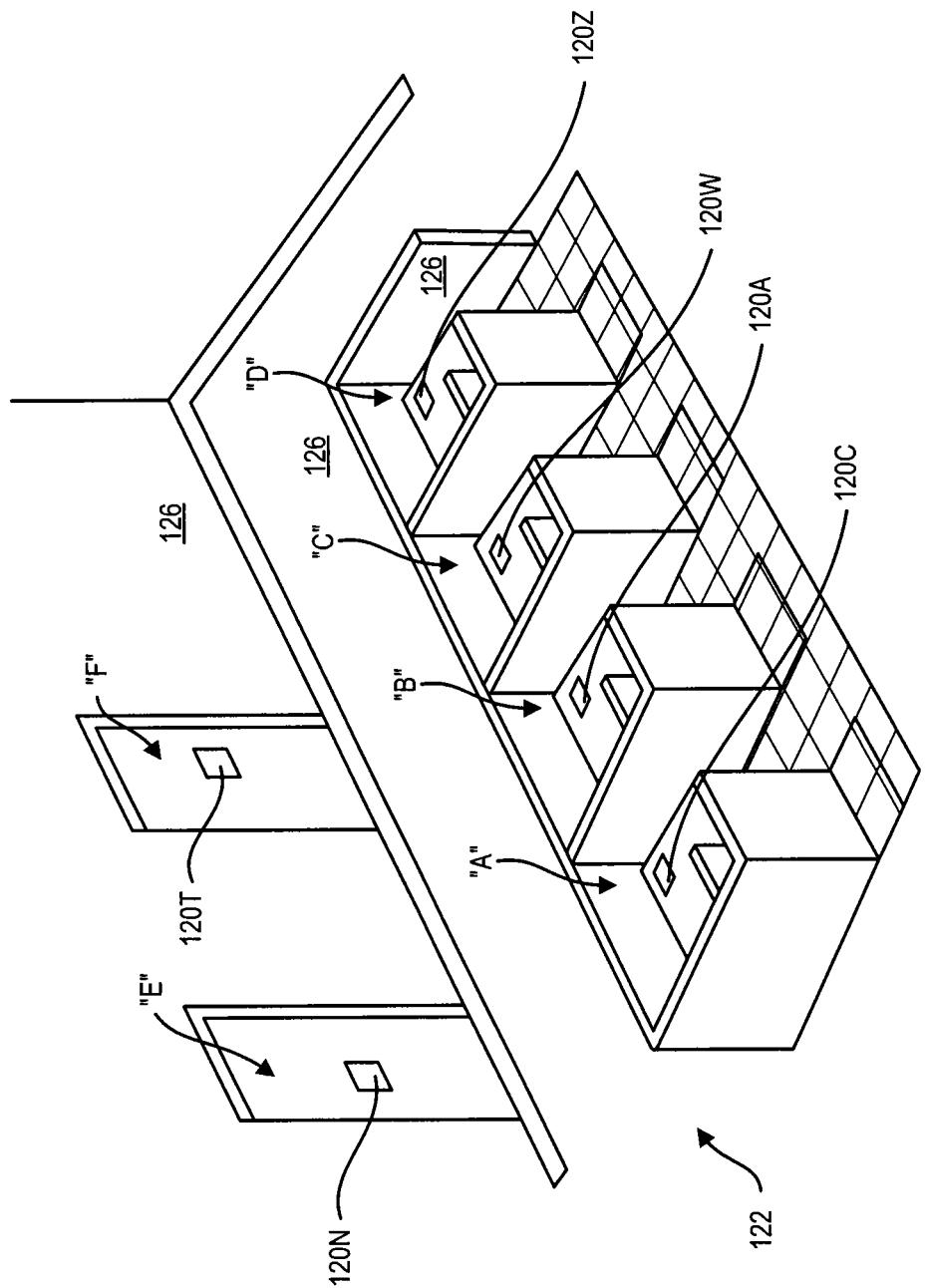
FIG. 2 is a physical form view depicting the venue in which there can be disposed client computer devices according to one embodiment.

Client computer devices 120A-120Z can be located within venue 122. A physical form view of venue 122 is depicted in FIG. 2. In venue 122, there can be disposed various infrastructure 126 (also represented in FIG. 1). Infrastructure 126 can include e.g. cubicles, floors, ceilings (not shown), and walls as shown in FIG. 2. Client computer devices 120A-120Z can be disposed in various locations throughout venue 122. As shown in FIG. 2, client computer devices 120A-120Z can be distributed, e.g. within cubicles A-D, conference room E, and/or closed office F.

Embodiments herein recognize that there is a risk of loss by unintended transfer of confidential content within a venue such as venue 122. For example, a user of a client computer device, e.g. client computer device 120A can be using client computer device 120A within cubicle B and can be engaging in an online conference with client computer device 120A disposed in cubicle B wherein the client computer device operates in accordance with users of remaining client computer devices of client computer devices 120B-120Z can also be engaging in online conferences other than conferences engaged in by the user of client computer device 120A in cubicle location B.

In one scenario that is described herein, a user of client computer device 120A in cubicle B can be engaged in a first conference with use of client computer device 120A operating in accordance with speakerphone operation and a second user of client computer device 120Z, e.g. at cubicle location D can be engaging in a second online conference, with users of system 100 external to venue 122 and who are agents of entities other than the enterprise operating manager system 110 and other than the entity conducting operations within venue 122. Thus, sound emanating from cubicle B associated to a first online conference can be picked up by client computer device 102Z of client computer devices 120B-120Z at cubicle location D and confidential audio content of the conference engaged in by one or more user at location B which is emitted from client computer device 120A in cubicle B and picked up by client computer device 120Z at cubicle D can thereby be presented to users outside of venue 122 who are agents of enterprises other than the enterprise that owns confidential audio content of a conference operating venue 122 and conducting operations within venue 122. Embodiments herein include various features incorporated within system 100 to mitigate loss of confidential content associated to the described scenario.

Still referring to FIG. 2, it will be understood that there are multiple embodiments of the scenario involving client computer device 120A and client computer device 120Z, where client computer device 120A emits audio content and client computer device 120Z is a bystander client computer device that picks up the emitted audio content. For example, client computer device 120A can be located at another location of locations A-E. Likewise, client computer device 120Z can be located at another location of locations A-E. Further alternative and/or additional client computer devices of client computer devices 120B-120Z can pick up and transmit confidential audio content externally of venue 122. As a conference proceeds, new client computer devices can transition into audio pickup range of client computer device 120A emitting confidential content, and client computer devices currently in audio pickup range of client computer device 120A emitting confidential content can transition so they are not in range.

In a special instance of the scenario involving client computer device 120A being a participant of a certain conference emitting confidential audio content picked up and transmitted externally of venue 122 by second client computer device 120Z that is not a participant of the certain conference, both client computer device 120A and client computer device 120Z can be used by a common user at a common location, e.g. location B. For example, a certain user can be participating in a first conference with a first client computer device 120A of the certain user, and can receive another call on a second client computer device 120Z of the certain user. The user can place the first client computer device 120A on mute, and take the second call to connect to a second conference. At this junction confidential audio content of the first client computer device 120A can be emitted by the first client computer device 120A, can be picked up by an audio input device of second client computer device 120Z, and can be transmitted externally of venue 122 by second client computer device 120Z e.g. to one or more user of client computer devices 130A-130Z.

Also, loss of confidential conference audio content is not limited to the situation of a second client computer device picks up confidential audio content of a first conference emitted by first client computer device participating in a first conference and transmits the content with audio content of a second conference to one or more external client computer device 130A-130Z. Embodiments herein recognize that confidential audio content can be lost by the recording of audio content. The second client computer device 120Z in the described scenario involving client computer device 120A and client computer device 120Z can be in record mode when picking up confidential conference audio content emitted by the first client computer device 120 operating in accordance with a speakerphone operation, and the recording by second client computer device 120Z can occur independent of whether the second client computer device 120Z is participating in a conference. In such a situation, confidential content is lost when the user of second client computer device 120C exits a venue 122 with recorded audio conference content.

Referring to FIG. 1, manager system 110 can include data repository 112 which can store various data. Data repository 112 can include decision data structure area 2121 for storing data structures for use in providing decisions, e.g. decisions in regard to a type of remedial action when there is detected a possible loss of confidential content. In signature sounds library area 2122 data repository 112 can store signature sounds such as inaudible sounds for use in altering audio content of online conferences mediated by system 100. In installation code library area 2123 data repository 112 can store software code for installation in components of system 100 such as conference call system 150 and client computer devices 120A-120Z, such as libraries and executable code for deployment by deployment process 113. The installation packages can for deployment on client computer devices 120A-120Z include libraries and executable code to facilitate a confidential mode profile that can be activated in a confidential mode.

Manager system 110 can run various processes. Manager system 110 can run, e.g. the aforementioned deployment process 113. Manager system 110 running deployment process 113 can deploy software code for facilitation of features of system 100, e.g. in conference call system 150 and client computer devices 120A-120Z. Manager system 110 running deployment process 113 can deploy in conference call system 150, signature sound embedding process 152 which can enable conference call system 150 to embed signature sounds onto content of online conference being mediated by conference call system 150. Manager system 110 running deployment process 113 can deploy into client computer devices 120A-120Z instances of risk control process 121.

A client computer device of client computer devices 120A-120Z running risk control process 121 can include the client computer device, e.g. activating mute functionality (e.g. adaptive or constant) or conference participation termination. Manager system 110 can run various other processes include examining process 114, speech to text process 115, natural language process (NLP) process 116, confidentiality classifier process 117, and decision process 118.

Manager system 110 running examining process 114 can examine audio content including audio speech content of online conferences being mediated by conference call system 150 for confidential content. Manager system 110 running examining process 114 can include manager system 110 running speech to text process 115, NLP process 116, and confidentiality classifier process 117.

Manager system 110 running examining process 114 can activate speech to text process 115 to translate incoming audio speech content of online conferences to text for further processing of the content via text based processing. Such text based processing can include processing by NLP process 116.

Manager system 110 running NLP process 116 can include manager system 110 running processes on unstructured data, e.g. unstructured text, audio, and/or video data to perform e.g. word segmentation, part of speech tagging, parsing, sentence breaking, and/or stemming. Manager system 110 running NLP process 116 can include manager system 110 running processes on unstructured data, e.g. unstructured text, audio, and/or video data to return one or more NLP output parameter can include, e.g. a topic parameter and/or a sentiment parameter. A sentiment parameter can be a bipolar sentiment parameter, e.g. a positive sentiment or a negative sentiment or can be a sentiment specifying one of multiple types of possible non-bipolar sentiments, e.g. "anger", "disgust", "fear", "sadness", and/or "joy". Manager system 110 can run NLP process 116 to process data for preparation of records that are stored in data repository 112 and for performance of iterative examining of conference audio speech content for the presence of confidential content. Manager system 110 can run a Natural Language Processing (NLP) process 113 for determining one or more NLP output parameter of a message. NLP process 113 can include one or more of a topic classification process that determines topics of messages and output one or more topic NLP output parameter, a sentiment analysis process which determines sentiment parameter for a message, e.g. polar sentiment NLP output parameters, "negative," "positive," and/or non-polar NLP output sentiment parameters, e.g. "anger," "disgust," "fear," "joy," and/or "sadness" or other classification process for output of one or more other NLP output parameters e.g. one of more "social tendency" NLP output parameter or one or more "style" NLP output parameter.

By running of NLP process 113 manager system 110 can perform a number of processes including one or more of (a) topic classification and output of one or more topic NLP output parameter for a received message (b) sentiment classification and output of one or more sentiment NLP output parameter for a received message or (c) other NLP classifications and output of one or more other NLP output parameter for the received message.

Topic analysis for topic classification and output of NLP output parameters can include topic segmentation to identify several topics within a message. Topic analysis can apply a variety of technologies e.g. one or more of Hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment sentiment analysis can classify the polarity of a given text at the document, sentence, or feature/aspect level—whether the expressed opinion in a document, a sentence or an entity feature/aspect is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

Manager system 110 running confidentiality classifier process 117 can return a confidentiality score to a conference being examined by examining process 114. Providing a confidentiality score, according to one embodiment can be provided in dependence on a plurality of factors, e.g. the presence of defined confidential topics of conferences, the frequency of instances of such confidential flagged topics, the presence of defined confidential keywords, and the frequency of instances of confidential flagged keywords.

Manager system 110 running decision process 118 can return artificial intelligence (AI) decisions. Based on resulting data resulting from running of examining process 114. Manager system 110 running decision process 118 can include manager system 110 using a decision data structure stored in decision data structure area 2121. Manager system 110 running decision process 118 according to one embodiment can use a decision data structure that cognitively maps confidentiality scores to actions which can define various levels of actions. For example, manager system 110 running confidentiality classifier process 117 can return a first action in response to a first confidentiality level and a second action in response to a second confidentiality level.

Conference call system 150 can be a conference call system provided by a third-party conference provider. As part of a subscriber service subscribed to by an entity operating manager system 110 in venue 122, conference system 150 can provide for functional adaptations for the benefit of the enterprise operating manager system 110 at venue 122. Conference call system 150 can run conference host process 151 which facilitates online conference functionality.

For providing online conference functionality, manager system 110 can be configured to operate in accordance with the real time transport protocol (RTP), which is set forth in Request For Comments (RFC) 3550 published by the Internet Engineering Task Force (IETF) and the Internet Society (ISOC).

Conference call system 150 in addition to including conference host process 151 can include signature sound embedding process 152. Conference call system 150 running signature sound embedding process 152 can embed conference calls with signature sounds so that audio data content of conference calls includes the embedded signature sound. This embedded signature sound can include sound of a frequency that can be detected by machine processing but which is inaudible to the human ear and therefore is not distracting to user's attention to the conference's audio speech content. The signature sound can be encoded with use of ultrasound frequency audio according to one embodiment. The embedded signature sound can be provided to have a pattern that is easily detected by machine processing which machine processing can be performed by manager system 110. Conference call system 150 running signature sound embedding process 152 can be configured to iteratively encode conference audio with a signature sound. Various advantages can be provided by the iterative encoding, for example, client computer devices transitioning into audio pickup range from a non-pickup range state can be assured of picking up the signature sound.

Each client computer device of client of computer devices 120A-120Z can include an audio input device 251, e.g., a microphone and an audio output device 252, e.g., a speaker. Each client computer device of client computer devices 120A-120Z can run risk control process 121 when a confidential mode profile of the client computer device is active. Each client computer device running risk control process 121 can activate one or more control to mitigate, e.g., reduce or eliminate unintended transference of confidential content. Each client computer device of client computer devices 130A-130Z can include an audio input device 251, e.g., a microphone and an audio output device 252, e.g., a speaker.

In reference to system 100 as shown in FIG. 1, client computer devices 120A-120Z can be located within venue 122 which can be operated by an enterprise operating manager system 110. Client computer devices 120A-120Z according to one example can be client computer devices provisioned by an enterprise that owns confidential conference audio content and which operates manager system 110 can venue 122. The provisioning of a client computer device 120A-120Z can include, e.g., providing of hardware and/or software of client computer device 120A to 120Z. Client computer device 120A-120Z can be client computer devices used by agents e.g. employees of an enterprise operating manager system 110 can venue 122. Client computer devices 130A-130Z can be client computer devices that are located external to venue 122 in which are being used by users other than users who are agents, e.g., employees of the enterprise operating manager system 110 and venue 122. Embodiments herein recognize the problem wherein for example, a client computer device 120A of client computer devices 120A-120Z as shown in FIG. 1 is engaging in a conference in accordance with speakerphone operation so that sound is emitted from client computer device 120A that can be picked up by audio input devices of client computer devices 120B-120C.

Client computer device 120Z in the scenario described in reference to FIG. 2 may not be connected to a first conference in which client computer device 120A is participating but nevertheless can via audio input device 251 of client computer device 120Z pick up the audio content of the first conference in which client computer device 120A is participating if client computer device 120Z is within audio pickup range of client computer device 120A which emits audio content of the first conference via audio output device 252 of client computer device 120A.

The picked up audio content that is picked up by client computer device 120Z via audio input device 251 of client computer device 120Z can be transmitted to venue external client computer devices 130A-130Z that are external to venue 122, such as client computer device 130Z which may be a participating in an online conference having client computer device 120Z and client computer device 130Z as participants. As set forth in further detail herein, the embedding of audio content by conference call system 150 with a signature sound that is machine detectable (e.g. by manager system 110) but human inaudible can be used for the detection and discrimination of risk conditions wherein confidential audio content can be at risk of loss by intended or unintended transfer to locations and client computer devices external to venue 122.

Figure 3A:
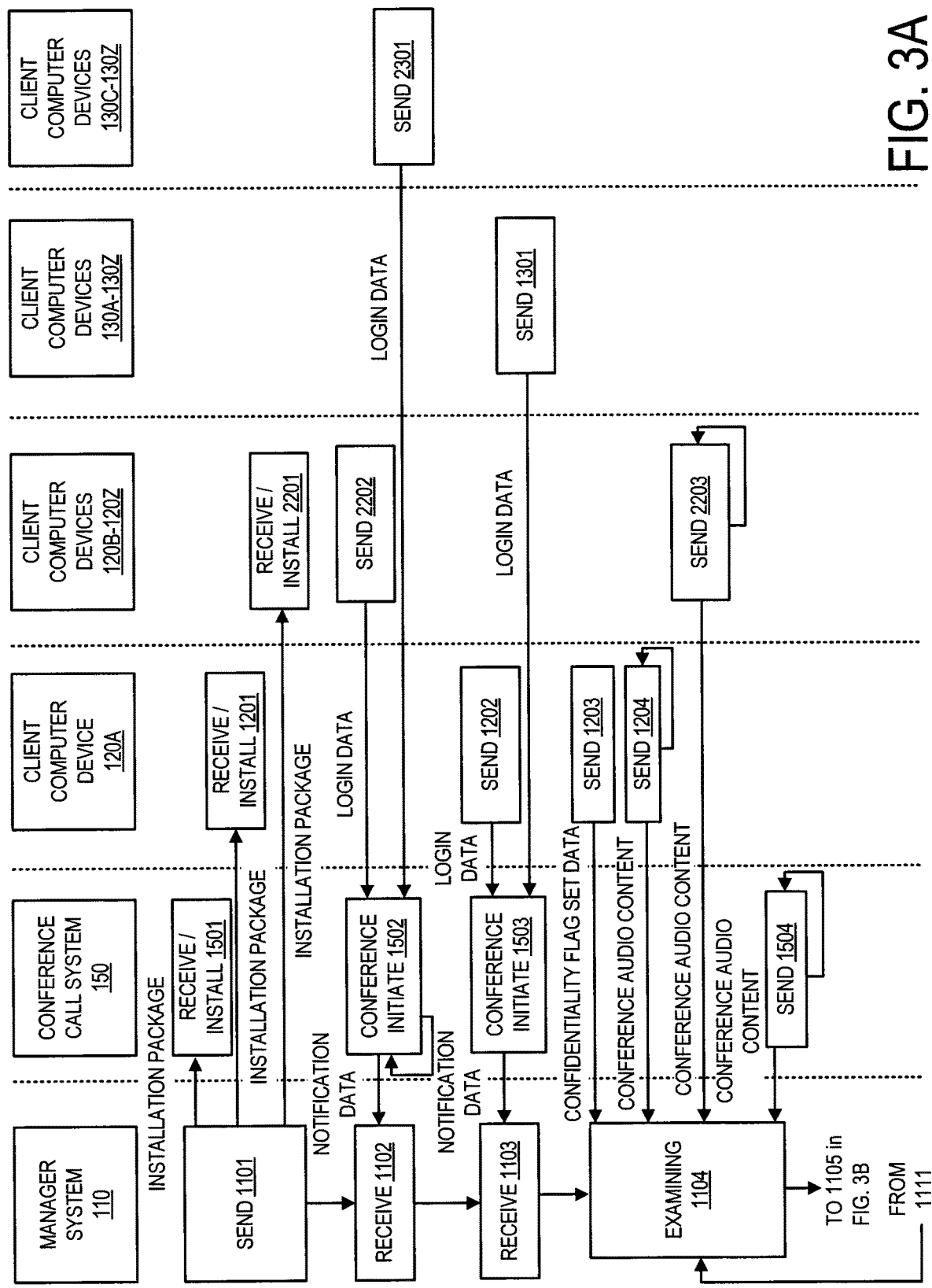
FIGS. 3A-3B are a flowchart depicting a method including a manager system in or operating with the conference call system and client computer device according to one embodiment.
Figure 3B:
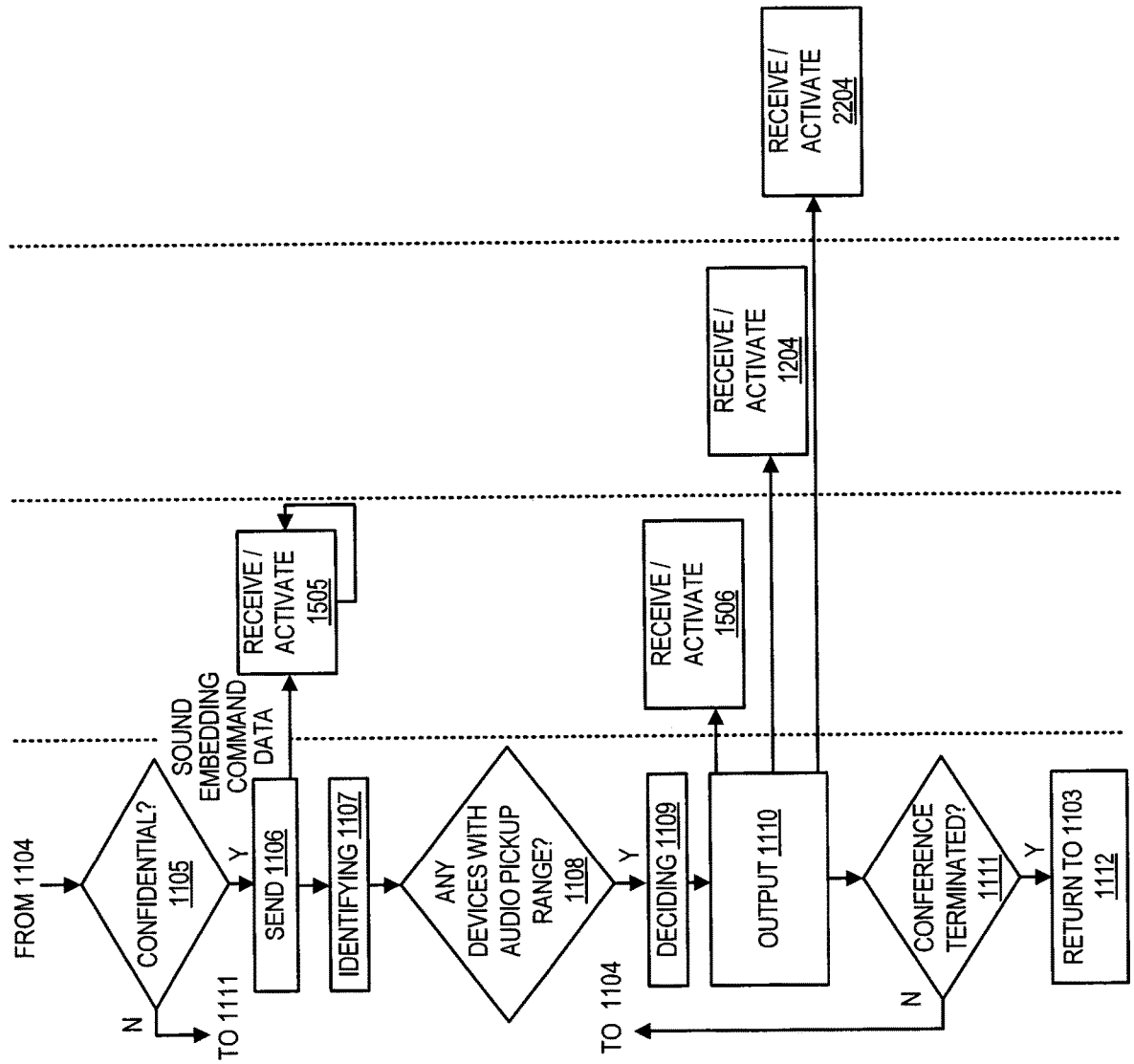

Aspects of a method that can be performed by manager system 110 interoperating with conference call system 150, client computer devices 120A-120Z and client computer devices 130A-130Z is set forth in reference to FIGS. 3A-3B.

Manager system 110, at block 1101, can send installation packages for receipt by conference call system 150 at block 1501 and for receipt by client computer devices 120A-120Z at blocks 1201 and 2201. The installation packages can include, e.g., libraries and executable code for the performance of signature sound embedding process 152 of conference call system 150 and risk control process 121 run by client computer devices 120A-120Z. Conference call system 150 on receipt installation package at block 1501 can install the installation package. Client computer device 120A on receipt of an installation package at block 1201 can install the installation package. Client computer devices 120B-120Z on receipt of the installation packages can install the installation packages. The installation packages described with reference to block 1101, 1501, 1201 and 2201 conference call system 150 is enabled to embed conference audio content with an embedded signature sound which signature sound can include a machine detectable but human inaudible sound.

On the received installation packages by client computer devices 120A to 120Z, the client computer devices 120A-120Z can be enabled to implement actions in response to the of confidential content. The installation packages can include libraries and executable code to facilitate a confidential mode profile that can be activated in a confidential mode.

At block 2202, client computer devices of client computer devices 120B-120Z can send conference login data and at block 2301, client computer devices of client computer devices 130C-130Z can send conference login data. The login data sent at block 2202 and block 2301 can be received by conference call system 150 at block 1502 and in response to the login data conference call system 150 can activate one or more online conference calls. The conference calls can be mediated by conference call system 150, e.g. using the real-time transport protocol (RTP) which is set forth in Request For Comments (RFC) 3550 published by the Internet Engineering Task Force (IETF) and the Internet Society (ISOC).

It will be understood that at any point in time in the operation of venue 122 a plurality of conference calls can be simultaneously mediated by conference call system 150. Conference calls of the plurality of conference calls can include participation by client computer devices of client computer devices 120A-120Z provisioned by manager system 110 operated by an enterprise that operates venue 122 and which owns confidential audio content of conferences mediated by conference call system 150. As indicated by the feedback loop provided in the association of block 1502, conferences can be iteratively initiated and terminated. That is new conferences can be iteratively initiated and active conferences can be terminated at different times by conference call system 150 during the operation of venue 122.

In the process of initiating new conferences and terminating existing conferences conference call system 150 at block 1502 as indicated by received block 1102 can send notification data to manager system 110 for receipt at block 1102 notifying manager system 110 of conference initiate instances and conference to terminate instances. Accordingly, manager system 110 can maintain in conferences area 2124 data repository a running track of all conferences that are currently being mediated by conference call system 150 as well as historical data specifying parameter values of past conferences mediated by conference call system 150. The functionality to provide notification data received at block 1102 can be provided with the installation package sent by manager system 110 at block 1101 and received and installed by conference call system 150 at block 1501. The functionality of conference call system 150 to provide notification data at blocks 1502 and 1503 and conference audio content at block 1504 can be provided by software code of the installation package installed at block 1501.

At block 1503, client computer device 120A at block 1202 can send conference login data and client computer devices 130A-130Z can send conference login data at block 1301. The login data in response to receipt of the conference login data sent at block 1202 and block 1301 by conference call system 150 at block 1503 can initiate a new conference participated in by client computer device 120A internal to venue 122 and client computer devices 130A-130B external to venue 122 and being operated by users who are users other than agents of the enterprises that runs manager system 110 and venue 122. In another use case scenario for illustration, client computer devices of client computer devices 120B-120Z can send login data for logging in to a conference to be participated in by client computer device 120A. In response to the received login data sent at block 1202 and 1301 for receipt by client conference call system 150, conference call system 150 at block 1503 can initiate a conference participated in by client computer device 120A and client computer devices 130A-130B (or alternatively, client computer devices 120A and one or more additional client computer device of client computer devices 120B-120Z or combination of client computer devices 120B-120Z and 130A-130Z).

In response to the initiation of a conference at block 1503, conference call system 150 can send notification data for receipt by manager system 110 that notifies manager system 110 that a conference has been initiated involving client computer device 120A and one or more other client computer devices.

In response to the receipt of notification data at block 1103, manager system 110 at examining block 1104 can perform examining of conference data of the conference initiated by conference call system 150 at block 1503. The examining at block 1104 can include examining of audio speech content of the initiated conference as well as other content. It will be recognized that while examining block 1104 depicts examining of a conference being participated in by client computer device 120A manager system 110 simultaneously while performing the examining at block 1104 can be examining audio speech content data of a plurality ongoing conferences that have been initiated at blocks 1502 by conference call system 150.

Based on the examining at block 1104, manager system 110 at block 1105 can determine whether a conference initiated at block 1503 includes confidential content. Determining whether a conference includes confidential content can include manager system 110 examining audio speech content of the conference initiated at block 1503. For examining audio speech content manager system at block 1503 examining at block 1104 for the determination of confidentiality at block 1105 by manager system 110 can include examination of audio speech content of the conference initiated at block 1503. Such examination can include the activation of speech to text process 115 (FIG. 1) NLP process 116 and classifier process 117.

According to one embodiment for performing speech to text conversion in one embodiment. IBM® WATSON® speech to text services can be utilized (IBM® and WATSON® are registered trademarks of International Business Machines Corporation). At block 1104, manager system 110 can be examining time windows of audio speech content for the determination of the presence of confidential content. Time segments including audio speech content can be subject to speech to text conversion and the return text can be subject to NLP processing by way of activation of NLP process 116 (FIG. 1).

The examining of conference data at block 1104 for the presence of confidential content can include examining of non-speech audio content and/or non-audio content of a conference. For example, can include examination of conference control data defined by a user. As indicated by block 1203, client computer device 120A can send confidentiality flag set data for receipt by manager system 110 during the iterative examining of audio content during the iterative examining of conference content by manager system 110 at block 1104. Such manually defined flag set data can be set e.g. using manually initiated DTMF Tones to embed the flag set data onto audio content of a conference for transmission in a conference audio channel DTMF Tones can be embedded with use of human inaudible audio signals so as to reduce distraction to conference participants. Manually defined flag data can alternatively be transmitted using a non-audio transmission channel of system 100 in which case flag data will not be encoded as sound data.

Client computer device 120A by way of software code included in the installation package installed at block 1201 can be functional so that in response to user defined input data defined using a user interface of client computer device 120A, client computer device 120A can set, in response to user input, a manually set confidentiality flag indicating that conference content is to be considered confidential.

Such a confidentiality flag can be manually set by a user of client computer device 120A. For example, a user of client computer device 120A participating in the conference initiated at block 1503 may determine by listening to audio content of the conference in which the user participates that the audio content has become confidential, e.g., relates to a confidential enterprise program. At such time the user can activate a control of the user interface of client computer device 120A to set a confidentiality flag in confidentiality flag data indicating the flag set can be sent to manager system 110 and the flag status can be examined by manager system 110 at block 1104. Accordingly, confidentiality determination by manager system 110 at block 1105 can include examining of conference audio content and non-audio content (e.g. the manually defined flag set data) of a conference such as the confidentiality flagged data described hereinabove. Examining of conference audio content at block 1104 for determining of a confidentiality status of the audio content can include manager system 110 returning a confidentiality score for the audio content as is set forth further herein. Where manager system 110 at block 1105 determines that audio content of a conference is confidential, e.g., by the examining of the audio content or non-audio content (confidentiality flag status). manager system 110 can proceed to block 1106 to determine whether a conference has been terminated. In response to determination at block 1111 that a conference has not been terminated, manager system 110 can return to block 1104 to perform examining of iteration of conference content examining.

In response to a determination at block 1105 that a conference includes confidential content manager system 110 can activate a confidential mode of system 100 and as part of operating in a confidential mode can proceed to block 1106. At block 1106, manager system 110 can send signature sound command data for receipt by conference call system 150 at block 1504. In response to the received signature sound command data received at block 1504, conference call system 150 can activate signature sound embedding process 152 (FIG. 1) so that the conference initiated at block 1503 is embedded with the signature sound. Embedding of a signature sound with conference audio content can include transmitting the signature sound on a common transmission channel with the conference audio content, which transmission channel can have wireline and wireless stages. Embedding of audio signals can result in the propagation of mixed or superposed signals components of which can be recovered by a receiving client computer device.

Conference call system 150 can be configured to perform the embedding so that the embedding is iteratively performed throughout a duration of the conference once the embedding is initiated. The signature sound embedding can be provided by a machine detectable but human inaudible sound, e.g., can be provided by an ultrasound audio signal that is embedded on conference audio content being received by client computer device 120A. Client computer device 120Z receiving the conference audio content having the embedded signature sound can be emitting iteratively e.g. continuously the audio conference content through audio output device 252 of client computer device 120A (which in some use cases is in a hands-free mode) so that the audio content can be picked up by client computer devices, e.g. including client computer device 120Z (FIGS. 1 and 2) within venue 122 in proximity thereto. Manager system 110 at block 1505 can iteratively embed a signature sound onto conference audio content for a duration of a conference or according to one embodiment for as long as a confidential mode is active. By such functionality confidential mode profiles of client computer devices of client computer device 120-120Z that due to changes of an environment (e.g. changing locations of one or more device or other changing conditions) are newly in pick up range of emitted audio content of an audio output device 252 of client computer device 120A can appropriately be activated.

Manager system 110 can be configured according to one embodiment, so that when a confidential mode is activated at block 1105 the confidential mode remains active for a duration of a conference in which the confidential mode is made active. Manager system 110 can be configured according to one embodiment, so that when a confidential mode is activated at block 1105 the confidential mode remains active for threshold period of time after it is activated and then terminates at the expiration of the threshold period unless additional confidential content is detected at examining block 1104 to re-set the threshold period.

At block 1107, manager system 110 can perform identifying of client computer devices that are potential sources of confidential content lost and can generate a list of such client computer devices. At block 1107, manager system 110 for such identifying can identify client computer devices of client computer devices 120B-120Z that are currently participating in online conferences and accordingly might be transferring confidential audio content to locations of client computer devices 130A-130Z external to venue 122.

Manager system 110 performing identifying at block 1107 can include manager system examining data of conferences area 2124 data repository 112. As noted, conferences area 2124 can include data specifying the status of all current conferences being mediated by conference call system 150. In one embodiment the enterprise operating manager system 110 and venue 122 and owning confidential conference audio content can subscribe to a service provided by conference call system 150 by the enterprise providing conference call system 150 so that all conference calls participated in by client computer devices 120A-120Z provisioned by an enterprise running manager system 110 are mediated by conference call system 150.

In reference to block 1107 manager system 110 can identify client computer devices of client computer devices 120A-120Z currently participating in conferences to generate a list of client computer devices that are potential sources of confidential content loss.

In one embodiment, manager system 110 can identify additional client computer devices of client computer devices 120Z as client computer devices that are potential sources of confidential content loss and can generate a list of such client computer devices. Embodiment herein recognize that loss of confidential conference audio content is not limited to the situation of a second client computer device picking up confidential audio content of a first conference emitted by first client computer device participating in a first conference and transmitting the content with audio content of a second conference to one or more external client computer device 130A-130Z. Embodiments herein recognize that confidential audio content can be lost by the recording of audio content. The second client computer device 120Z in the described scenario involving client computer device 120A and client computer device 120Z can be in record mode when picking of confidential conference audio content emitted by the first client computer device 120 operating in accordance with a speakerphone operation, and the recording by second client computer device 120Z can occur independent of whether the second client computer device 120Z is participating in a conference. In such a situation, confidential content is lost when the user of second client computer device 120C exits a venue 122 with recorded audio conference content stored on client computer device 120C or otherwise transmits the recorded audio content.

At block 1108, manager system 110 can determine whether there are any client computer devices within an audio pickup range of the audio content attributable to the conference initiated at block 1503 being emitted through audio output device 252 of client computer device 120A.

For performing the determination of block 1108 by manager system 110 client computer devices 120A at block 1204 and client computer devices 120B-120Z at block 2203 can be sending conference audio content to manager system 110 for receipt and examination by manager system 110 at examining block 1104. Based on a list of client computer devices 120B-120Z that are sources of confidential content loss returned at identifying block 1107, manager system 110 for determination of devices within audio pickup range can, according to one embodiment, limit its examination to client computer devices of client computer devices 120B-120Z that are currently participating in active online conferences, and in one embodiment can examine client computer devices of a longer list, e.g. can examine all client computer devices of client computer devices 120A-120Z.

For determination of whether a client computer device on the reference list returned at block 1107 is within audio pickup range, manager system 110 at block 1108 can ascertain whether the embedded signature sound emitted by audio output device 252 of client computer device 120A which has been embedded at block 1505 is picked up by any of the remaining client computer devices 120B-120Z specified in the reference list of block 1107.

Where an embedded signature sound is picked up by one or more client computer device of client computer devices 120B to 120Z, it can be determined that the picking up client computer devices of the client computer devices 120B-120Z are within audio pickup range and therefore are at risk of transmitting and/or recording picked up confidential audio content from the conference initiated at block 1503. When emitted and machine detectable ultrasound content is picked up by an audio input device of client computer device 120Z in the scenario described with reference to FIG. 2, there is provided an indication that non-ultrasound audio content (e.g. the confidential audio conference content) is also capable of being picked up by input device of client computer device 120Z, which client computer device is capable of transmitting and/or recording the confidential content.

For proper coordination of functionalities, data repository 112 can store in signature sound library area 2122 a list as depicted in Table A.

TABLE A

| Active Conferences | Signature sound for Embedding |
|---|---|
| C001 | A915 |
| C009 | A914 |
| C017 | A923 |
| C022 | A912 |
| C023 | A901 |

As shown in Table A, signature sound library 2122 can include a list of currently active conferences associated to signature sound embeds where there is just one signature sound associated to each active conference. Manager system 110 can allocate signature sounds for embedding, e.g., as can be identified by identifiers shown in Table A, e.g., A915, A914, etc. so that the same signature sound is not allocated simultaneously to more than one concurrently active conference. Each signature sound can be identified by the unique identifier as indicated in Table A can include a unique sound. By the coordinate described in reference to Table A, manager system 110 can have associated therewith a different signature sound thus avoiding the possibility that a certain client computer device of client computer devices 120A and 120Z erroneously determining that it is receiving a signature sound from a neighboring client computer device, when in reality it is receiving a signature sound emitted by itself. As set forth herein a confidential mode profile can have different functions in dependence on a level of confidentiality of a conference. Accordingly, embedding different conferences determined to include confidential content with different signature sounds facilitates a client computer device that picks up confidential content operating in accordance with confidential mode profile functions that are appropriate for the level of confidentiality of audio content picked up by the client computer device.

The allocating of different signature sounds for different conferences facilitates a client computer device picking up signature sounds of first and second conferences having confidential content to respond differently and appropriately in dependence on which signature sound and which conference's audio is being picked up. A client computer device 120Z can be in audio pickup range of client computer device 120A emitting audio content of a first conference and client computer device 120B (FIG. 2) emitting audio content of a second conference. At time T1, only the first conference includes confidential content (of relatively low confidentiality level), and so in response to the condition at time T1, client computer device 120Z performs a first set of one or more functions to mitigate loss of confidential content. At time T1, a perceivable time period after T2, inclusion of confidential content (of relatively high confidentiality level) in the second conference can be detected for a first time. In response to the condition at time T2, client computer device 120Z can perform a second set of one or more functions, differentiated from the first set of one or more functions, to mitigate loss of confidential content. There is set forth herein a method, wherein the method includes embedding a second signature sound on audio content of a second conference, the second signature sound being differentiated from the signature sound, the embedding a signature sound occurring at a first time, the embedding a second signature sound occurring at a second time a perceivable time period after the first time, wherein the process to mitigate loss of the confidential content is performed by the second client computer device and includes performing a first set of one or more functions, wherein the method includes receiving by the audio input device of the second client computer device the audio content of the second conference having embedded thereon the second signature sound, wherein the method includes in response to the receiving the audio content of the second conference adjusting process to mitigate loss of the confidential content so that the process to mitigate loss of confidential content includes performing a second set of one or more functions that are differentiated from the first one or more functions.

Manager system 110 can be configured so that when an active conference is terminated a signature sound identified by a unique identifier can be returned to a signature sound pool for use by a subsequent conference that is initiated.

In deciding block 1109, manager system 110 can return an action decision. The action decision can include a specified action that is associated to a level of confidentiality of the conference initiated at block 1503. For returning an action decision, manager system 110 at deciding block 1109 can use decision data structure stored in decision data structures area 2121. An example of a decision data structure for use and returning an action decision is illustrated in reference to Table B.

TABLE B

| Confidentiality Score | Action |
|---|---|
| 7 < p | Terminate examined conference |
| 6 < p ≤ 7 | Terminate participation in examined conference |
| 5 < p ≤ 6 | Terminate conference of bystander client computer device |
| 4 < p ≤ 5 | Terminate participation by user of bystander client computer device |
| 3 < p ≤ 4 | Continuous muting of bystander client computer device |
| 0 < p ≤ 3 | Adaptive muting of bystander client computer device |
| 0 | No action |

As shown in Table B, various actions can be associated to different confidentiality scores. In reference to Table B for a confidentiality score of zero assigned to a conference there can be specified no action. For a confidentiality score p of greater than 0 and less than or equal to 3, there can be specified the action of adaptive muting of bystander client computer device microphones. In the scenario depicted in reference to FIG. 2 client computer device 120Z can be a bystander client computer device that picks up audio content emitted from client computer device 120A. By adaptive muting it is meant that the bystander client computer device client computer device is muted adaptively so that the audio input device 251 of client computer device 120Z is normally muted but is unmuted automatically only intermittently when the user of client computer device 120Z speaks. For further reference to Table B, for conference confidentiality scores of greater than 3 and less than or equal to 4, the returned action decision can be the action decision to implement a continuous (not adaptive) muting of the bystander device so that functionality of the bystander client computer device microphone is disabled. Manager system 110 can be configured so that manager system 110 sets a confidentiality score to the highest possible value in response to receipt of manually defined confidentiality flag set data.

For confidentiality scores of greater than 4 and less than or equal to 5, the action decision can be the action decision to terminate conference participation of the bystander device, e.g., including client computer device 120Z in the described example. For confidentiality scores of greater than 5 and less than or equal to 6, the action decision can be the action decision to terminate the conference of the bystander client computer device and not merely the conference participation of the bystander device. For confidentiality scores of greater than 6 and less than or equal to 7, the action decision can be the action decision to terminate participation in the examined conference meaning that in the described example, the participation of client computer device 120A and the conference initiated at block 1503 can be terminated. For conference confidentiality scores greater than 7 the action decision can be the action to terminate the examined conference altogether. According to Table B, the remedial confidential audio content loss mitigation action specified is scaled according to the scale of the conference score with more aggressive remedial actions being applied for conferences having confidentiality scores of higher values.

Another example of a decision data structure stored in decision data structure area 2121 for use in returning an action decision is illustrated in reference to Table C.

TABLE C

| Confidentiality Score | Action |
|---|---|
| 3 < p | Terminate examined conference, terminate conference participation by user of bystander client computer device, disable conference applications and disable audio recording applications of bystander client computer device |
| 2 < p ≤ 3 | Terminate conference participation by user of bystander client computer device, disable conference applications and disable audio recording applications of bystander client computer device |
| 1 < p ≤ 2 | Mute bystander client computer device and disable audio recording applications of bystander client computer device |
| 0 < p ≤ 1 | Mute bystander client computer device |
| p = 0 | No action |

As shown in Table C, various actions can be associated to different confidentiality scores. In reference to Table C for a confidentiality score of zero assigned to a conference there can be specified no action. For a confidentiality score p of greater than 0 and less than or equal to 1, there can be specified the action of muting the bystander client computer device. For conference confidentiality scores of greater than 1 and less than or equal to 2, the returned action decision can be the action decision to mute the bystander client computer device and disable audio recording applications of the bystander client computer device. For conference confidentiality scores of greater than 2 and less than or equal to 3, the returned action decision can be the action decision to terminate conference participation by user of bystander client computer device, disable conference applications and disable audio recording applications of bystander client computer device to mute the bystander client computer device and disable audio recording applications of the bystander client computer device. For conference confidentiality scores of greater than 3, the returned action decision can be the action decision to terminate the examined conference, terminate conference participation by user of bystander client computer device, disable conference applications and disable audio recording applications of bystander client computer device to mute the bystander client computer device and disable audio recording applications of the bystander client computer device. Manager system 110 can be configured so that manager system 110 sets a confidentiality score to the highest possible value in response to receipt of manually defined confidentiality flag set data.

Manager system 110 according to one embodiment can trigger the actions specified in a decision data structure as shown in Table B or Table C by sending to client computer device 120A a confidentiality message which includes first control data to activate a confidential mode profile that has been installed at client computer device at block 1201 and second control data to activate the function specified in Table B or Table C with the confidential mode profile activated.

In reference to the features described in reference to Table B and Table C it will be appreciated that functions performed by a client computer device 120Z which can define a bystander client computer device can adaptively change in dependence on changes in a confidentiality level of an ongoing conference audio content of which can be emitted by a first client computer device 120A and picked up by client computer device 120Z. Client computer device 120Z can perform a first set of functions to less aggressively mitigate loss of confidential content in response to a detection of a relatively low level on confidentiality of content of a first conference, and can adaptively perform a second set of functions to more aggressively mitigate loss of confidential content in response to a detection of a relatively low level on confidentiality of content of the first conference, and In the described example for client computer device 120Z is a bystander client computer device within audio pickup range of client computer device 120A, the described remedial actions described in reference to Table B can be implemented by client computer device 120Z running client risk control process 121 and/or client computer device 120A running risk control process 121 can return a conference's confidentiality score indicative of a confidentiality level with higher scores indicating a higher level of confidentiality. Manager system 110 can apply Eq. 1 as follows.

$$P = F_1 W_1 + F_2 W_2 \quad \text{(Eq. 1)}$$

Where $F_1$ is a first factor, $F_2$ is a second factor and $W_1$ and $W_2$, respectively, are weights associated to the first and second factors, respectively. According to one embodiment, the factor $F_1$ can be a confidentiality topic factor. In accordance with the confidentiality topic factor a value under the factor can be applied in proportion to instances of confidentiality topics being presented in a conference. As set forth herein, a determination of confidentiality topics can be applied with use of activation of speech to text process 115 and NLP process 116 to return topic classifiers for an ongoing conference. Factor $F_2$ in the described example can be a confidentiality keyword factor. According to factor $F_2$ a value under the confidentiality keyword factor can be applied in proportion to instances of confidentiality keywords being presented in an ongoing conference. According to one example, confidentiality topics can be topics that generally relate to confidential subject matter. Confidentiality topics can include for example tests, e.g., market tests, product tests, products, employee reviews, salaries and/or earnings. Confidentiality keywords can be keywords having special meaning for a specific enterprise and can relate, e.g., to ongoing confidential projects, e.g., can be the project name of a project being advanced by the enterprise operating manager system and venue 122 and owning confidential conference audio content.

Figure 4:
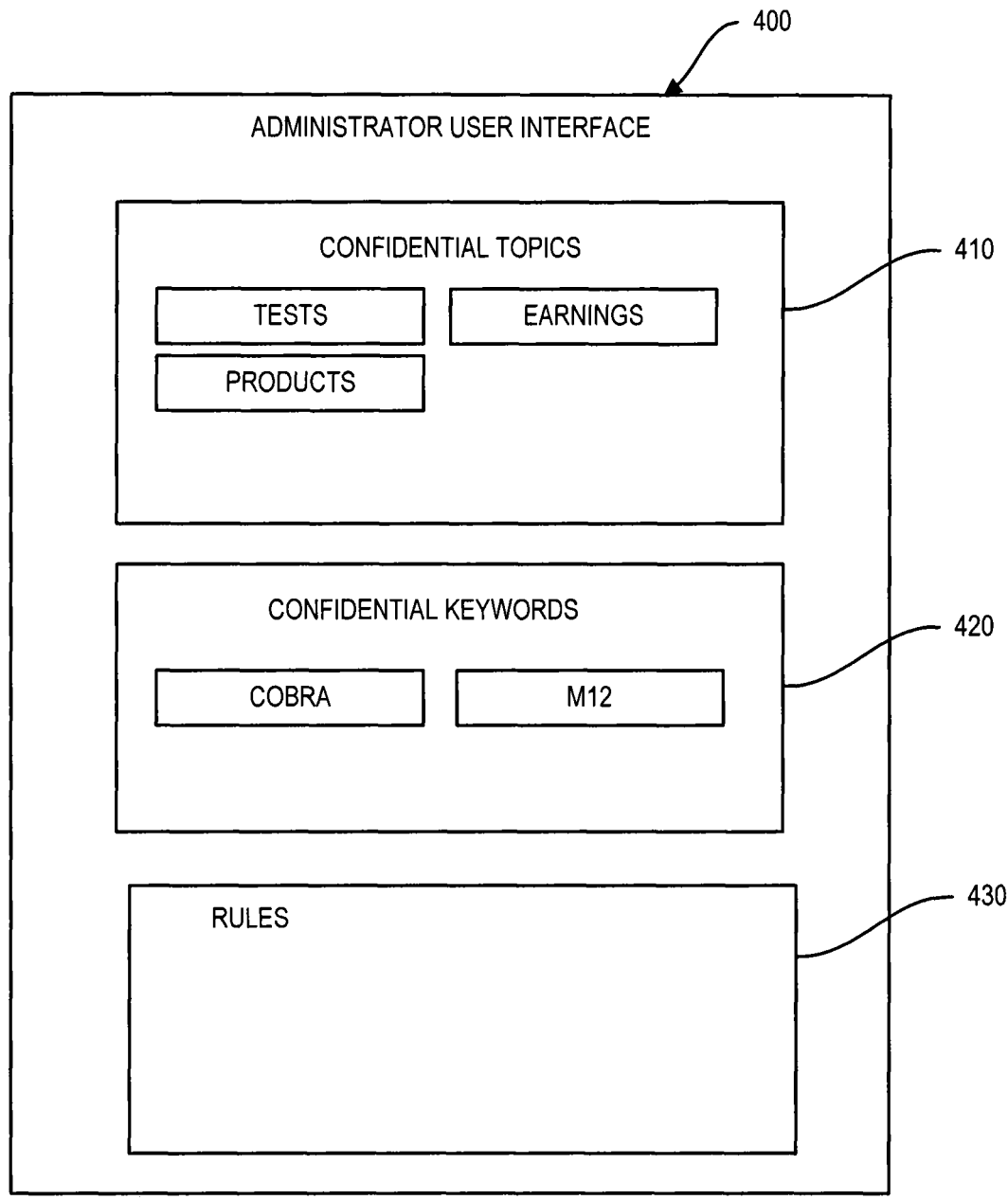
FIG. 4 depicts an administrator user interface according to one embodiment.

FIG. 4 depicts administrator user interface 400 that can be displayed on a display of administrator client computer device 140 as shown in FIG. 1. Using area 410 and administrator user can custom define confidential topics, e.g., such topics as test products and earnings. An area an administrator user can define confidential keywords, for example, such fictitious proprietary keywords as may relate to a confidential enterprise project such as "COBRA" or "M12" as depicted in FIG. 4 and the user interface 400 of FIG. 4. In rules area 430, an administrator using rules area 430 of administrator user interface 400 and administrator user can define such rules as action decisions specified in a decision data structure, for example the decision data structure described with reference to Table B herein. In examining block 1104, manager system can be receiving conference audio content from client computer device 120A which can be sent at block 1204. Client computer devices 120B-120Z sent to block 2203 and/or conference call system 150 which can be sent at block 1504.

In response to completion of deciding block 1109, manager system 110 can proceed to block 1110 to provide one or more output for facilitation of the action decision returned at block 1109. Providing one or more output at block 1110 can include manager system 110 sending communications for receipt by conference call system 150 at block 1506 to client computer device 120A for receipt at block 1204 and/or to client computer devices of client computer devices 120B-120Z for receipt, e.g. by client computer device 120Z at block 2204. In response to the received communications received at blocks 1506, 1204, and 2203, the specified action decision can be activated and implemented by conference call system 150, client computer device 120A or client computer device 120Z.

Manager system 110 according to one embodiment can trigger the actions specified in Table B by sending to client computer device 120Z at block 1110 in the described scenario a confidential mode message which includes first control data to activate a confidential mode profile that has been installed on client computer device 120Z at block 1201 and second control data to activate the function specified in Table B with the confidential mode profile activated. For transmission of a communication including a confidential mode message, manager system 110 can use a non-audio channel available within system 100.

Additionally or alternatively, manager system 110 can at block 1110 communicate a confidential mode message to client computer device 120Z using an audio channel of a conference being mediated by conference call system 150. Manager system 110 for communication of a confidential mode message according to one embodiment can at block 1110 send a communication to conference call system 150 in response to which conference call system 150 can embed onto audio content of the conference being examined at block 1104 the confidential mode message encoded as audio content. The confidential mode message can be encoded as human inaudible but machine detectable audio content, e.g. in ultrasound audio. As part of the audio content of an ongoing conference the confidential mode message can be emitted by an audio output device of client computer device 120A participating in the conference subject to the examining at block 1104. The confidential mode message can be encrypted for audio emission and client computer devices 120A-120Z capable of detecting the sound can be capable of decrypting the encrypted content, e.g. by way of executable code installed as part of the installation package installed at block 1201 and 2201. Transmitting the confidential mode message over an audio channel conserves communication channel consumption of system 100. In embodiments where a confidential mode message is transmitted over an audio channel, manager system can be configured to iteratively re-transmit the confidential mode message. Embedding of a signature sound and a confidential mode message with conference audio content can include transmitting the signature sound and confidential mode message on a common transmission channel with the conference audio content, which transmission channel can have wireline and wireless stages. Embedding of audio signals can result in the propagation of mixed or superposed signals, components of which can be recovered by a receiving client computer device.

Where a confidential mode message is communicated over an audio channel, client computer devices 120A-120Z operating with a confidential mode profile active such as client computer device 120Z in the described example can be configured to terminate the confidential mode profile in response to a failure for a threshold period of time of a client computer device 120Z to receive a confidential mode message which is being iteratively re-transmitted. Embodiments herein recognize that when a client computer device e.g. client computer device 120Z in the described scenario fails to receive an iteratively re-transmitted confidential mode message for a threshold period of time, the client computer device 120Z is out of pickup range of audio speech content being emitted over an audio output range, and therefore no longer presents a risk of confidential content loss. Accordingly, it can be seen that the method of communicating a confidential mode message using an audio channel reduces complexity of system 100, e.g. can avoid transmission of control signals.

At block 1111 manager system 110 can determine whether the conference initiated at block 1503 has been terminated. If the conference is not terminated, manager system can return to block 1104 to perform the next iteration of examining conference content, e.g., conference audio content and/or conference control content (e.g., by the manual raising of a confidentiality flag). In the case that a conference initiated at block 1503 has been terminated manager system 110 can proceed to block 1112. At block 1112, manager system 110 can return to block 1103 to wait for a next conference involving client computer device 120A to be initiated.

According to the embodiment as set forth in reference to the flowchart of FIG. 3A-3B function blocks 1104-1109 can be performed by manager system 110. However, it will be understood that such functions can be distributed functions which alternatively or additionally can be performed by client computer devices of client computer devices 120A-120Z. A client computer of client computer devices 120A-120Z according to one embodiment can be configured to activate a confidential mode profile on receipt of a signature sound and/or an audio encoded confidential mode message through an audio input device 251 of the client computer device e.g. client computer device 120Z as received over the air from an audio output device 252 of a client computer device participating in a conference that has confidential content and to deactivate a confidential mode profile in response to a failure for a threshold period of time of the client computer device of client computer devices 120A-120Z to receive an audio encoded signature sound and/or confidential mode message which can be iteratively re-transmitted.

There is set forth herein a system that can prevent client computer devices e.g. mobile smartphone devices, computing node based telephones, from intentionally or inadvertently capturing confidential content broadcast over speakerphone during a conference call. The system according to one embodiment can trigger a confidential mode when confidential content is being discussed on a call, and can send a signal to nearby mobile devices encoded in ultrasound to prevent them from rebroadcasting and/or recording this information.

Embodiments herein recognize that many conference calls are conducted with participants using speakerphones. For example, a group of conference call participants can be gathered around a desk or conference room listening to a conference call on speaker, or an individual may listen to a call in their office on speakerphone enabling them to also operate their computer hands-free. It is common for many of these conference calls to include the discussion of confidential content, such as unannounced products, strategy discussions, personnel discussions, and so forth. There is the potential that people in the surrounding area may overhear these discussions and potentially rebroadcast or record them on their client computer device e.g. mobile device. This confidential content could be exposed intentionally as a malicious act or, more likely, unintentionally though scenarios such as (a) secondary phone calls and (b) audio recording.

According to the (a) example (secondary phone call), a client computer device of a first user (e.g. a desktop phone or smartphone) in handsfree speakerphone operation may be broadcasting audio content of a conference. The audio conference content can be picked up by one or more client computer devices of one or more other user in audio pickup range of the client computer device of the first user. The audio conference content can be transmitted from the one or more client computer devices to external destinations e.g. client computer devices used by users who are not agents of the enterprise that owns the confidential content.

Also in accordance with the (a) example (secondary phone call) a first client computer device of a user (e.g. a desktop phone) may go on mute in response to receipt of a user input of a user who answers a call or VOIP chats on a second client computer device of the user, e.g. a smartphone. The receiving party from the second client computer device call may inadvertently overhear confidential content discussed during the conference call that is still being broadcast in speakerphone operation by the first client computer device.

According to the (b) example (audio recording) a person recording a voice memo, or other audio recording, on their client computer device e.g. smartphone may inadvertently record confidential conversations in the background as played across a nearby speakerphone.

Embodiments herein can include special provisioning of client computer devices of users who are agents of an enterprise that owns confidential content. Embodiments herein can include installing a configuration profile for all employees as part of corporate mobile device security requirement. The configuration profile when active can disable certain mobile application functionalities if triggered. The configuration profile when active can operate in a manner that is adaptive to a detected level of confidentiality.

Embodiments herein can include triggering of a confidential mode, either manually or through a cognitive system. A cognitive system can trigger a confidentiality mode in response to confidential content being discussed on a conference call According to one embodiment, a configuration profile can be activated on all client computer devices within audio pickup range (e.g. within "earshot") of a conference call being played over speaker and in a confidential mode to frustrate (e.g. prevent or reduce) pickup range client computer devices from rebroadcasting and/or recording the confidential audio content.

There is set forth herein a method and system by which a configuration profile is made active on client computer devices tom activate restrictions on application (e.g. mobile apps in the case of a mobile client computer device) when a confidential mode is active.

A system having a conference call system can trigger a confidential mode when confidential content is discussed on the call. A confidential mode can be triggered manually by user conference call participants or automatically through a cognitive system monitoring for confidential content e.g. confidential audio content information being discussed on a call. When a confidential mode is active an inaudible e.g. ultrasound audio signal can be sent from an audio output device of a client computer device dialed in to a conference call and can be received by nearby client computer devices e.g. mobile devices. Client computer devices receiving the signature sound signal can activate the configuration profile to restrict activities that would otherwise enable the confidential call conversations to be rebroadcast and/or recorded, by for example disabling conference call and voice memo applications on the audio pickup range client computer devices e.g. mobile devices.

There is set forth herein a system that enables user participants on a conference call to manually activate a confidential mode configuration profile on nearby client computer devices that can overhear a conversation including confidential content. There is set forth herein a system that utilizes a cognitive system to analyze the spoken audio content of a conference call to detect the discussion of confidential content and active a confidential mode configuration profile on nearby client computer devices such as mobile devices. There is set forth herein a system that uses ultrasound sent from audio output devices of client computer devices dialed in to a conference call and received by nearby mobile devices to prevent the content of the conference call being rebroadcast and/or recorded.

According to one embodiment, a client computer device confidential mode configuration profile is created. The confidential mode configuration profile can be made active in response to an examining of data resulting in a determination that a conference audio content includes confidential content. The confidential mode configuration profile can defines which functionalities of which application can be used or which are restricted when the confidential mode configuration profile is activated. For example if the confidential mode configuration profile is made active, the configuration profile can define the following behaviors for application e.g. mobile apps: conference call applications can be terminated. If a conference call application is currently running, the current call is either automatically disconnected or muted. Recording applications e.g. voice memo apps can also be disabled.

According to one embodiment an enterprise e.g. a business corporation can require all agents e.g. including employees with client computer devices e.g. mobile devices which can be used in a venue of the enterprise to install the confidential mode configuration profile to their client computer device e.g. mobile device as part of their mobile device security policy. Additionally the confidential mode configuration profile can be installed on client computer devices of visitors of an enterprise (for example when the location of a user's client computer device is at a corporation office).

According to one example user participants of a conference call can dial in to a conference call bridge hosted by a conference call system. One or more participants may be attending the call via client computer device that broadcasts audio content of the conference over an audio output device e.g. speaker. If confidential content is discussed during the call, a confidential mode can be triggered to prevent nearby mobile devices from intentionally or unintentionally rebroadcasting and/or recording confidential portions of the call.

A confidential mode can be triggered in multiple ways. For manual triggering, before confidential content is discussed or responsively to the recognition of confidential content by listening a conference call participant user can enter via a user interface an input e.g. a tone code signal (for example #11) to manually turn on confidential mode. The user interface can be Dual Tone Multi-Frequency Signaling (DTMF) based, or another type of user interface can be used. When the confidential portion of the call is complete, the host or participant can issue another code to turn off confidential mode. A cognitive system can automatically activate a confidential mode. A cognitive system can derive when audio content of a conference call is confidential, and automatically activate a confidential mode.

The cognitive system can receive the audio stream from the conference call and perform various processing including speech to text processing for conversion of audio voice into text, and Natural Language Processing (NLP) for processing of the returned text.

The system performing NLP can examine the returned text generated by speech to text processing to understand the intent behind the conversation and to classify the audio content converted to text. Classifying can include comparing text to a list of confidential topics and keywords. For example the system can look for text associated to confidential topic or to express mentions of a confidential project name. A confidential mode can be activated in response to one or more criterion being satisfied. One or more criterion can specify requirements in relation to instances of confidential topics and/or keywords.

In response to activation of a confidential mode audio content of a conference can be embedded with a signature sound. The signature sound can be of ultrasound frequency. In response to receipt of signature sound by a neighboring bystander client computer device in audio pickup range of the bystander client computer device a confidential mode configuration profile can be activated on the one or more bystander client computer device. When confidential mode is activated the system can generate and send a confidential mode message to send to nearby client computer devices recognized as audio pickup range client computer device. The confidential mode message can include data specifying a level of confidentiality. For example highly confidential content can be rated High and less important confidential content rated Medium. A scoring system can be used, and loss mitigating actions can be associated to each of several score ranges.

A duration of a confidential mode can optionally be specified (for example turn on confidential mode for 5 minutes). The confidential mode message, according to one embodiment, can be transcribed into ultrasound and encoded in an ultrasound signal that is embedded in conference audio content with the signature sound so that it is simultaneously broadcast with the conference audio content and the signature sound. Ultrasound is sound with a frequency greater than 20 kHz and is inaudible to humans.

Ultrasound communication including the embedded signature sound and the embedded confidential mode message can be played iteratively over a conference call bridge along with the audible content of a conference. The playing of an ultrasound communication can be in response to detection of confidential content with use of e.g. examining a manually raised flag and/or examining audio speech content. Client computer devices broadcasting the conference call over an audio output device in a handsfree operating mode will also be broadcasting the confidential mode message encoded in ultrasound. Client computer devices within audible range of the conference call (for example client computer devices close enough to be able to pick up a conference call conversation played over an audio output device) will receive the ultrasound communication. The ultrasound communication can be processed by the system and the confidential mode configuration profile installed on the client computer device can be activated in response to detection of a signature sound. The content of the confidential mode message can be used to determine how the configuration profile is applied. For example, when the level of confidentiality is set to High, disconnect any existing phone calls. For Medium, mute an existing phone call but do not disconnect. When emitted and machine detectable ultrasound content is picked up by an audio input device of client computer device 120Z in the scenario described with reference to FIG. 2, there is provided an indication that non-ultrasound audio content (e.g. the confidential audio conference content) is also capable of being picked up by input device of client computer device 120Z, which client computer device is capable of transmitting and/or recording the confidential content.

When a client computer device is no longer receiving a confidential mode message over ultrasound (either because the conference call is no longer transmitting confidential content, or the client computer device is no longer within audible range of the conference call) the confidential mode configuration profile can be deactivated and access to phone calls and recording functionality provided by application e.g. mobile apps is no longer restricted.

Certain embodiments herein offer various technical competing advantages involving advantages to address problems arising in the realm of computer networks and systems. One or more decision data structure can be used to return artificial intelligence (AI) decisions based on confidentiality classifications of online computer implemented conferences having audio content. Embodiments herein can improve the performance of a computer systems and networks in the environment of online conferences including by the identification of confidential content of such conferences. Embodiments herein can include the deployment of software code installation packages so that a conference call system and client computer devices can function in a manner to preserve confidentiality of conference audio content. Embodiments herein can include the embedding of conference audio content with a signature sound. The risk situation can be detected by the pickup of the signature sound by a bystander neighboring client computer device that is not participating in the conference having audio content subject to signature sound embedding. For enhancement of computation accuracies embodiments herein can feature computer platforms existing only in the realm of computer networks such as artificial intelligence (IA platforms). Embodiments herein can employ data structuring processes, e.g., processing for transferring unstructured data into a form optimized for computerized processing. For example, speech content, speech audio content of an online conference can be subject to speech to text processing to convert the conference content to text and the text can be subject to NLP processing for use in returning a confidentiality score of an online conference. Certain embodiments of the present invention may be implemented by use of a cloud platform/data center in various types including a Software-as-a-Service (SaaS), Platform-as-a-Service (PaaS), Database-as-a-Service (DBaaS), and combinations thereof based on types of subscription. The static optimization service may be provided for subscribed business entities and/or individuals in need from any location in the world.

Figure 7:
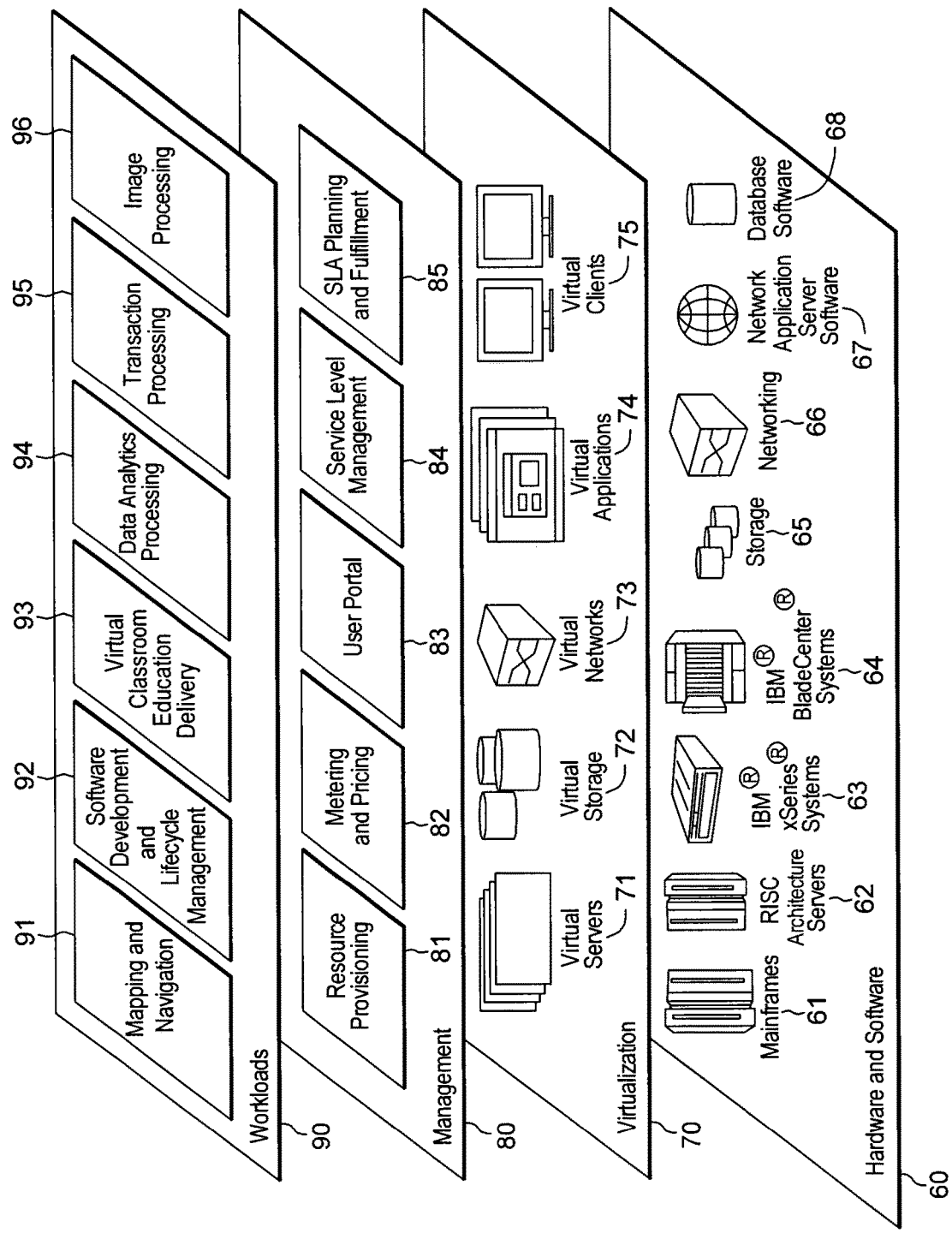
FIG. 7 depicts abstraction model layers according to one embodiment.

FIGS. 7-9 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
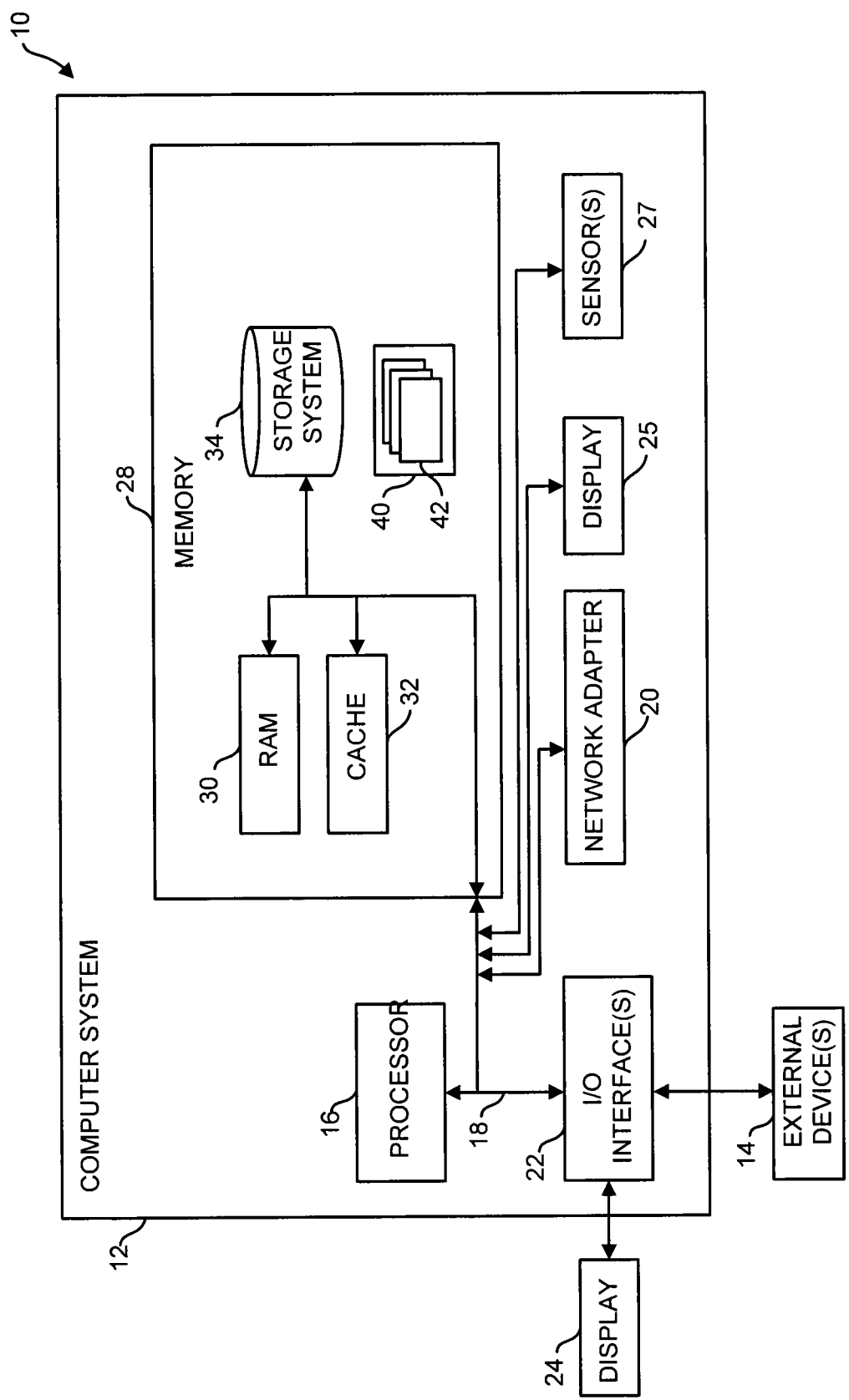
FIG. 5 depicts a computing node according to one embodiment.

Referring now to FIG. 5, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 5, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 6-7.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. One or more program 40 can define machine logic. In one embodiment, manager system 110 can include one or more computing node 10 and can include one or more program 40 for performing functions described with reference to manager system 110 as set forth in the flowchart of FIGS. 3A-3B. In one embodiment, one or more client computer device 120A-120Z can include one or more computing node 10 and can include one or more program 40 for performing functions described with reference to one or more client computer device 120A-120Z as set forth in the flowchart of FIGS. 3A-3B. In one embodiment, one or more client computer device 130A-130Z can include one or more computing node 10 and can include one or more program 40 for performing functions described with reference to one or more client computer device 130A-130Z as set forth in the flowchart of FIGS. 3A-3B. In one embodiment, administrator client computer device 140 can include one or more computing node 10 and can include one or more program 40 for performing functions described with reference to administrator client computer device 140 as set forth in the flowchart of FIGS. 3A-3B. In one embodiment, the computing node based systems and devices depicted in FIG. 1 can include one or more program 40 for performing functions described with reference to such computing node based systems and devices.

Figure 6:
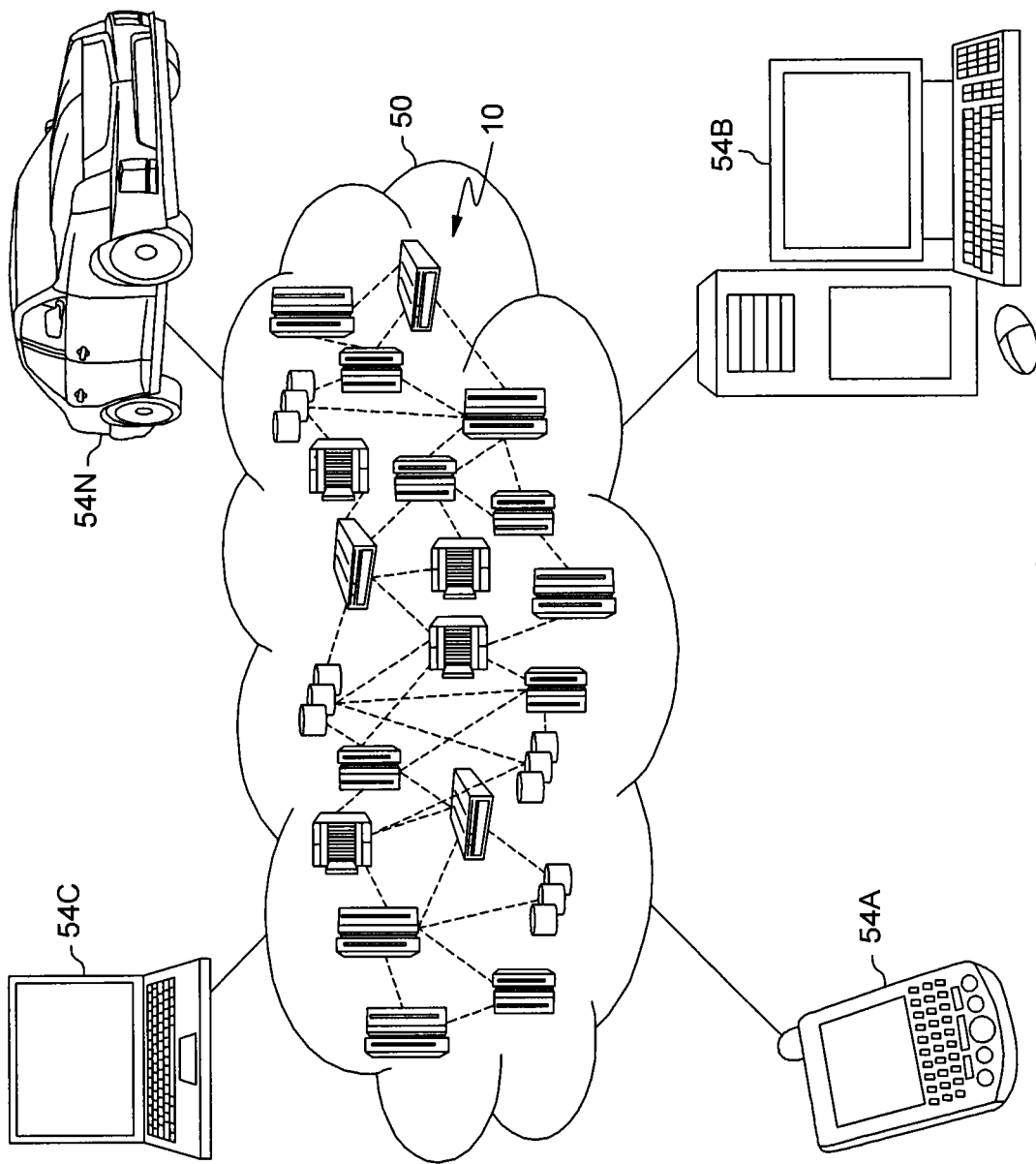
FIG. 6 depicts a cloud computing environment according to one embodiment.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively or additionally be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 6 computing node 10 is described as being implemented in a cloud computing environment and accordingly is referred to as a cloud computing node in the context of FIG. 6.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6 is shown. It should be understood in advance that the components, layers, and functions shown in FIG. 7 are intended to be illustrative only and embodiments of the invention are not limited thereto. As depicted, the following layers and corresponding functions are provide.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for mitigating loss of confidential audio content as set forth herein. The processing components 96 can be implemented with use of one or more program 40 described in FIG. 5.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer-implemented method comprising:
   embedding a signature sound on audio content of a first conference in which a first client computer device is connected, wherein the audio content includes confidential content, the signature sound being a sound that is machine detectable and human inaudible;
   emitting through an audio output device of the first client computer device the audio content of the first conference having embedded thereon the signature sound;
   receiving by an audio input device of a second client computer device the audio content of the first conference having embedded thereon the signature sound; and
   in response to the receiving activating a process to mitigate loss of the confidential content, wherein the first client computer device is a client computer device of a first user, wherein the embedding a signature sound on audio content is performed by a conference call system that is configured to encrypt the signature sound and to mediate on-line conferences participated in by the first client computer device of the first user and a client computer of another user, wherein the method includes sending for installation on the second client computer device an installation package for configuring the second client computer device to decrypt the embedded signature sound which has been embedded and encrypted by the conference call system.

2. The computer-implemented method of claim 1, wherein the embedding a signature sound on audio content of a first conference in which a first client computer device is connected is performed in response to a detecting that the first conference includes confidential content.

3. The computer-implemented method of claim 1, wherein the embedding a signature sound on audio content of a first conference in which a first client computer device is connected is performed in response to a detecting that the first conference includes confidential content, wherein the detecting is based on a result of one or more of the following selected from the group consisting of (a) examining audio speech content of the first conference, and (b) examining manually defined confidential flag status data.

4. The computer-implemented method of claim 1, wherein the embedding a signature sound on audio content of a first conference in which a first client computer device is connected is performed in response to a detecting that the first conference includes confidential content, wherein the detecting is based on a result of an examining speech content of the first conference, and wherein the embedding a signature sound is iteratively performed until the first conference terminates.

5. The computer-implemented method of claim 1, wherein the embedding a signature sound on audio content of a first conference is performed in response to a detecting that the first conference includes confidential content, wherein the detecting is based on a result of an examining speech content of the first conference, wherein the examining speech content includes identifying instances of speech content including a confidential topic.

6. The computer-implemented method of claim 1, wherein the method includes embedding a second signature sound on audio content of a second conference, the second signature sound being differentiated from the signature sound, the embedding a signature sound occurring at a first time, the embedding a second signature sound occurring at a second time a perceivable time period after the first time, wherein the process to mitigate loss of the confidential content is performed by the second client computer device and includes performing a first set of one or more functions, wherein the method includes receiving by the audio input device of the second client computer device the audio content of the second conference having embedded thereon the second signature sound, wherein the method includes in response to the receiving the audio content of the second conference adjusting the process to mitigate loss of the confidential content so that the process to mitigate loss of confidential content includes performing a second set of one or more functions that are differentiated from the first set of one or more functions.

7. The computer-implemented method of claim 1, wherein the method includes embedding a second signature sound on audio content of a second conference, the second signature sound being differentiated from the signature sound, the embedding a signature sound occurring at a first time, the embedding a second signature sound occurring at a second time a perceivable time period after the first time, the embedding a signature sound on audio content of the first conference being performed in response to a detecting that the first conference includes confidential content, the embedding a signature sound on audio content of the second conference being performed in response to a detecting that the second conference includes confidential content.

8. The computer-implemented method of claim 1, wherein the embedding a signature sound on audio content of a first conference is performed in response to a detecting that the first conference includes confidential content, wherein the activating a process to mitigate loss of the confidential content is triggered by receipt of a confidential mode signal by the second client computer device that is provided in response to the receiving by the audio input device of the second client computer device the audio content of the first conference having embedded thereon the signature sound.

9. The computer-implemented method of claim 1, wherein the method includes determining a level of confidentiality of the confidential content, and wherein the determining a level of confidentiality of the confidential content includes employing a speech to text process to convert audio content of the first conference to text, and further performing Natural Language Processing of the text to return topic classification of the text, wherein according to the process to mitigate loss of the confidential content the second client computer device performs, at a first time, a first set of one or more functions, and performs at a second time a second set of one or more functions differentiated from the first set of one or more functions.

10. The computer-implemented method of claim 1, wherein the method includes determining a level of confidentiality of the confidential content, and wherein the determining a level of confidentiality of the confidential content includes employing a speech to text process to convert audio content of the first conference to text, and further performing Natural Language Processing of the text to return topic classification of the text, wherein according to the process to mitigate loss of the confidential content the second client computer device performs, at a first time, a first set of one or more functions, and performs at a second time a second set of one or more functions differentiated from the first set of one or more functions, wherein the first set of one or more functions is performed in response to a detecting that the first conference includes a first level of confidentiality, and wherein the second set of one or more functions is performed in response to a detecting that the first conference includes a second level of confidentiality differentiated from the first level of confidentially.

11. The computer-implemented method of claim 1, wherein the process to mitigate loss of confidential content includes the second client computer device disabling all conference call applications of the second client computer device.

12. The computer-implemented method of claim 1, wherein the process to mitigate loss of confidential content includes the second client computer device disabling all audio recording applications of the second client computer device.

13. The computer-implemented method of claim 1, wherein the process to mitigate loss of confidential content includes the second client computer device muting the second client computer device.

14. The computer-implemented method of claim 1, wherein the process to mitigate loss of confidential content includes the second client computer device disabling all conference call applications of the second client computer device, wherein the process to mitigate loss of confidential content includes the second client computer device disabling all audio recording applications of the second client computer device.

15. The computer-implemented method of claim 1, wherein the method includes embedding a second signature sound on audio content of a second conference, the second signature sound being differentiated from the signature sound, the embedding a signature sound occurring at a first time, the embedding a second signature sound occurring at a second time a perceivable time period after the first time, wherein the process to mitigate loss of the confidential content is performed by the second client computer device and includes performing a first set of one or more functions, wherein the method includes receiving by the audio input device of the second client computer device the audio content of the first conference having embedded thereon the second signature sound, wherein the method includes in response to the receiving the audio content of the second conference adjusting the process to mitigate loss of the confidential content so that the process to mitigate loss of confidential content includes performing a second set of one or more functions that are differentiated from the first set of one or more functions, wherein the process to mitigate loss of confidential content includes the second client computer device disabling all conference call applications of the second client computer device, wherein the process to mitigate loss of confidential content includes the second client computer device disabling all audio recording applications of the second client computer device, wherein the embedding a signature sound on audio content of a first conference is performed in response to a detecting that the first conference includes confidential content, wherein the activating a process to mitigate loss of the confidential content is triggered by receipt of a confidential mode signal by the second client computer device that is provided in response to the receiving by the audio input device of the second client computer device the audio content of the first conference having embedded thereon the signature sound, wherein the confidential mode signal is encoded as a machine detectable but human inaudible signal and is embedded on the audio content of the first conference with the signature sound.

16. The computer-implemented method of claim 1, wherein the first client computer device is a client computer device of a first user, and wherein the second client computer device is a client computer device of the first user.

17. The computer-implemented method of claim 1, wherein the first client computer device is a client computer device of a first user, wherein a client computer of another user is connected to the first conference with the first client computer device, and wherein the first conference is an on-line conference in which the first client computer device of the first user and the client computer of the another user participate.

18. The computer-implemented method of claim 1, wherein the method includes receiving and installing, by the first client computer device, an installable package so that the first client computer device is configured to decrypt embedded signature sounds which have been embedded and encrypted by the conference call system.

19. A computer program product comprising:
a computer readable storage medium readable by one or more processing circuit and storing instructions for execution by one or more processor for performing a method comprising:
embedding a signature sound on audio content of a first conference in which a first client computer device is connected, wherein the audio content includes confidential content, the signature sound being a sound that is machine detectable and human inaudible;
emitting through an audio output device of the first client computer device the audio content of the first conference having embedded thereon the signature sound;
receiving by an audio input device of a second client computer device the audio content of the first conference having embedded thereon the signature sound; and
in response to the receiving activating a process to mitigate loss of the confidential content, wherein the first client computer device is a client computer device of a first user, wherein the embedding a signature sound on audio content is performed by a conference call system that is configured to encrypt the signature sound and to mediate on-line conferences participated in by the first client computer device of the first user and a client computer of another user, wherein the method includes sending for installation on the second client computer device an installation package for configuring the second client computer device to decrypt the embedded signature sound which has been embedded and encrypted by the conference call system.

20. A system comprising:
a memory;
at least one processor in communication with the memory; and
program instructions executable by one or more processor via the memory to perform a method comprising:
  embedding a signature sound on audio content of a first conference in which a first client computer device is connected, wherein the audio content includes confidential content, the signature sound being a sound that is machine detectable and human inaudible;
  emitting through an audio output device of the first client computer device the audio content of the first conference having embedded thereon the signature sound;
  receiving by an audio input device of a second client computer device the audio content of the first conference having embedded thereon the signature sound; and
  in response to the receiving activating a process to mitigate loss of the confidential content, wherein the first client computer device is a client computer device of a first user, wherein the embedding a signature sound on audio content is performed by a conference call system that is configured to encrypt the signature sound and to mediate on-line conferences participated in by the first client computer device of the first user and a client computer of another user, wherein the method includes sending for installation on the second client computer device an installation package for configuring the second client computer device to decrypt the embedded signature sound which has been embedded and encrypted by the conference call system.

* * * * *